(12) United States Patent
Heneveld, Jr. et al.

(10) Patent No.: US 10,610,429 B2
(45) Date of Patent: Apr. 7, 2020

(54) ROTARY ACTUATOR HAVING CLUTCH ASSEMBLY FOR USE WITH PATIENT SUPPORT APPARATUS

(71) Applicant: Stryker Corporation, Kalamazoo, MI (US)

(72) Inventors: William Ross Heneveld, Jr., Kalamazoo, MI (US); Martin W. Stryker, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 483 days.

(21) Appl. No.: 15/635,817

(22) Filed: Jun. 28, 2017

(65) Prior Publication Data

US 2018/0000672 A1 Jan. 4, 2018

Related U.S. Application Data

(60) Provisional application No. 62/356,366, filed on Jun. 29, 2016.

(51) Int. Cl.
*A61G 7/015* (2006.01)
*A61G 7/018* (2006.01)
(Continued)

(52) U.S. Cl.
CPC ............. *A61G 7/015* (2013.01); *A61G 7/002* (2013.01); *A61G 7/012* (2013.01); *A61G 7/018* (2013.01);
(Continued)

(58) Field of Classification Search
CPC ........ A61G 7/002; A61G 7/005; A61G 7/012; A61G 7/015; A61G 7/018; A61G 13/02;
(Continued)

(56) References Cited

U.S. PATENT DOCUMENTS

| 1,629,277 A | 5/1927 | Koeb |
| 2,481,477 A | 9/1949 | Perry |

(Continued)

FOREIGN PATENT DOCUMENTS

| CN | 205859053 U | 1/2017 |
| FR | 2714135 A1 | 6/1995 |

(Continued)

OTHER PUBLICATIONS

YouTube, Renold Sprag Latch, published May 28, 2012; URL: https://www.youtube.com/watch?v=Fsp3fm4KHs0.

(Continued)

*Primary Examiner* — Robert G Santos
(74) *Attorney, Agent, or Firm* — Howard & Howard Attorneys PLLC

(57) ABSTRACT

An actuator for use in effecting movement of a movable member with respect to a first member of a patient support apparatus. A motor is provided for generating rotational torque. A carrier is adapted to be secured to the first member. An input member is coupled to the motor for concurrent rotation. An output member is adapted to be coupled to the movable member. A reduction geartrain is supported between the input member and the output member. A clutch assembly is disposed in torque-translating relationship between the reduction geartrain and the output member and moves between: an engaged configuration wherein torque from the motor is translated across the reduction geartrain to move the movable member with respect to the first member, and a disengaged configuration wherein torque is at least partially interrupted across the reduction geartrain to allow movement of the movable member independent of rotation of the motor.

25 Claims, 13 Drawing Sheets

(51) Int. Cl.
| | | |
|---|---|---|
| *A61G 7/002* | (2006.01) | |
| *A61G 7/012* | (2006.01) | |
| *F16H 19/08* | (2006.01) | |
| *F16H 1/32* | (2006.01) | |
| *F16D 11/14* | (2006.01) | |
| *F16H 25/06* | (2006.01) | |

(52) U.S. Cl.
CPC ............... *F16D 11/14* (2013.01); *F16H 1/32* (2013.01); *F16H 19/08* (2013.01); *F16H 25/06* (2013.01)

(58) Field of Classification Search
CPC ........ A61G 13/04; A61G 13/06; A61G 13/08; A47C 20/04; A47C 20/041; A47C 20/08; F16H 1/32; F16H 19/08; F16D 11/14
USPC ..................... 5/610, 611, 613, 616, 617, 618
See application file for complete search history.

(56) References Cited

U.S. PATENT DOCUMENTS

| | | | | |
|---|---|---|---|---|
| 2,504,737 A | | 4/1950 | Sharpes | |
| 2,605,481 A | * | 8/1952 | Burkhart | A47C 20/08 5/616 |
| 2,913,300 A | * | 11/1959 | Darnell et al. | A61G 7/002 5/616 |
| 2,947,364 A | | 8/1960 | Haworth | |
| 3,129,607 A | * | 4/1964 | Schaefer | A61G 7/018 74/665 GA |
| 3,198,891 A | * | 8/1965 | Burst et al. | A61G 7/018 200/5 E |
| 3,278,952 A | * | 10/1966 | Holm | A47C 20/041 5/616 |
| 3,307,663 A | | 3/1967 | Luenberger | |
| 3,583,248 A | | 6/1971 | Langenberg | |
| 3,627,377 A | | 12/1971 | Pickles | |
| 3,972,081 A | * | 8/1976 | Stern | A61G 7/002 5/618 |
| 4,047,842 A | | 9/1977 | Avena et al. | |
| 4,062,075 A | * | 12/1977 | Stern | A61G 7/002 5/611 |
| 4,271,726 A | | 6/1981 | Ryffel | |
| 4,398,313 A | * | 8/1983 | Mitchell | A47C 20/042 5/611 |
| 4,425,673 A | * | 1/1984 | Werner | A61G 7/018 5/611 |
| 4,472,845 A | * | 9/1984 | Chivetta | A61G 7/015 5/611 |
| 4,472,846 A | * | 9/1984 | Volk, Jr. | A61G 7/015 192/48.2 |
| 4,480,733 A | | 11/1984 | Grimm et al. | |
| 4,499,618 A | * | 2/1985 | Werner | A47C 19/045 192/48.8 |
| 4,747,212 A | | 5/1988 | Cavdek | |
| 4,890,979 A | | 1/1990 | Ames et al. | |
| 5,102,377 A | | 4/1992 | Spanski | |
| 5,269,031 A | * | 12/1993 | Alexander | A47C 20/041 192/48.2 |
| 5,355,743 A | | 10/1994 | Tesar | |
| 6,231,012 B1 | | 5/2001 | Cacciola et al. | |
| 6,631,797 B2 | | 10/2003 | Capewell | |
| 6,739,004 B1 | | 5/2004 | Abrahamsen et al. | |
| 7,802,331 B2 | | 9/2010 | Brown et al. | |
| 8,308,599 B2 | | 11/2012 | Akami | |
| 8,981,271 B1 | | 3/2015 | Risner et al. | |
| 2005/0160856 A1 | | 7/2005 | Sugitani | |
| 2011/0113556 A1 | | 5/2011 | Roussy et al. | |
| 2011/0319217 A1 | | 12/2011 | Imase et al. | |
| 2012/0060276 A1 | | 3/2012 | Heidlage et al. | |
| 2014/0053333 A1 | | 2/2014 | Krieg et al. | |
| 2014/0155215 A1 | | 6/2014 | Rademakers | |
| 2014/0371028 A1 | | 12/2014 | Billmeyer | |
| 2015/0283924 A1 | | 10/2015 | Boutouil et al. | |
| 2016/0070247 A1 | | 3/2016 | Ohishi et al. | |
| 2016/0076624 A1 | | 3/2016 | Uchihara et al. | |
| 2016/0156248 A1 | | 6/2016 | Lueker | |
| 2016/0302985 A1 | | 10/2016 | Tessmer et al. | |
| 2017/0059002 A1 | | 3/2017 | Sasaki | |
| 2017/0335944 A1 | | 11/2017 | Nishimura | |
| 2018/0000670 A1 | | 1/2018 | Bartley et al. | |
| 2018/0000672 A1 | * | 1/2018 | Heneveld, Jr. | A61G 7/018 |
| 2018/0000673 A1 | | 1/2018 | Bartley | |
| 2018/0000674 A1 | | 1/2018 | Bartley | |
| 2018/0000675 A1 | | 1/2018 | Heneveld, Jr. et al. | |
| 2020/0008991 A1 | * | 1/2020 | Wu | A61G 7/018 |

FOREIGN PATENT DOCUMENTS

| | | |
|---|---|---|
| JP | 2003180762 A | 7/2003 |
| JP | 2017041210 A | 2/2017 |
| JP | 2017137888 A | 8/2017 |
| WO | 0117399 A1 | 3/2001 |
| WO | 0117400 A1 | 3/2001 |

OTHER PUBLICATIONS

GMN Bearing USA, Functionality of the Sprag Clutch Design, available as least as early as Jun. 23, 2016; URL: https://www.gmnbt.com/sprag-clutch-design.htm.

Youtube, Renold Trapped Roller Clutch, published May 28, 2012; URL: https://www.youtube.com/watch?v=QjR7dimpSJA.

MOOG, Aircraft Mechanical Actuators, available at least as early as Feb. 3, 2016; URL: http://www.moog.com/products/actuators-servoactuators/actuation-technologies/mechanical/aircraft-mechanical-actuators/.

YouTube, Hypocycloid Reducer, 100:1, Internal View, published Apr. 23, 2009; URL: https://www.youtube.com/watch?v=SH46bpe1cNA.

English language abstract and machine-assisted translation for JP2003180762 extracted from espacenet.com on Feb. 20, 2018; 9 pages.

English language abstract and machine-assisted English translation for CN205859053 extracted from espacenet.com database on Jul. 26, 2018, 12 pages.

English language abstract and machine-assisted English translation for FR 2 714 135 extracted from espacenet.com database on Jul. 26, 2018, 7 pages.

English language abstract and machine-assisted English translation for JP 2017-041210 extracted from PAJ database on Jul. 26, 2018, 54 pages.

English language abstract and machine-assisted English translation for JP 2017-137888 extracted from espacenet.com database on Jul. 26, 2018, 26 pages.

Crouzet Motors, "Crouzet Webpage", downloaded from http://motors.crouzet.com on Jul. 25, 2018, 3 pages.

Crouzet Motors, "80 W Motomate Planetary Gearboxes Part Number Made to Order Brochure", www.crouzet.com, Feb. 11, 2015, 4 pages.

Crouzet Motors, "Motors and Gearmotors Panorama Brochure", Jul. 2016, 5 pages.

Lin, Wang-Sung et al., "Design of a Two-Stage Cycloidal Gear Reducer with Tooth Modifications", Mechanism and Machine Theory, vol. 79, 2014, pp. 184-197.

Motion Solutions—RM Hoffman Division, "Nabtesco Motion Conrol Solutions—Cycloidal Gear Reducers Webpage", http://www.rmhoffman.com/nabtesco-motion-control.html, 2018, 4 pages.

Nabtesco, "High Performance Reduction Gears & Servo Actuators Brochure", 2018, 12 Pages.

ONVIO LLC, "Zero Backlash Speed Reducers Brochure", 2005, pp. 1-19.

* cited by examiner

ROTARY ACTUATOR HAVING CLUTCH ASSEMBLY FOR USE WITH PATIENT SUPPORT APPARATUS

RELATED APPLICATIONS

This application claims the benefit of and priority to U.S. Provisional Patent Application No. 62/356,366, filed on Jun. 29, 2016, the entire contents and disclosure of which are hereby incorporated by reference herein in their entirety.

BACKGROUND

Patient support apparatuses such as hospital beds, stretchers, cots, wheelchairs, and the like are employed to help facilitate care of patients in a health care setting. Conventional patient support apparatuses include a base operatively attached to a patient support surface upon which the patient is supported. Often, patient support apparatuses also include one or more movable members such as lift members, patient support deck sections, bed length extension members, bed width extension members, wheels, side rails, footboards, and headboards. Such movable members may be moved, manipulated, or otherwise positioned manually and/or with the use of one or more actuators. Typically, conventional patient support apparatuses employ linear actuators to move movable members. Conventional linear actuators are relatively large and tend to require an undesirable amount of space within the patient support apparatus. Rotary actuators may also be used to move the movable members. However, conventional rotary actuators are often unable to prevent movable members from back driving in response to force applied to the movable members, causing the movable members to move into undesirable positions in certain situations, such as during power loss or when components break. Additionally, conventional rotary actuators generally lack desirable stiffness which would otherwise give a caregiver or patient confidence in the structural integrity of the rotary actuator. Furthermore, conventional rotary actuators lack mechanisms that enable users to operatively disconnect an input member of the rotary actuator from an output member connected to the movable member so that the movable member can be easily and quickly moved, manipulated, or otherwise positioned manually, such as during a critical event (for example, when a patient is in cardiac arrest and requires CPR).

While actuators used in connection with patient support apparatuses have generally performed well for their intended purpose, there remains a need in the art for an actuator and patient support apparatus which overcome the disadvantages in the prior art.

DETAILED DESCRIPTION

Figure 1:
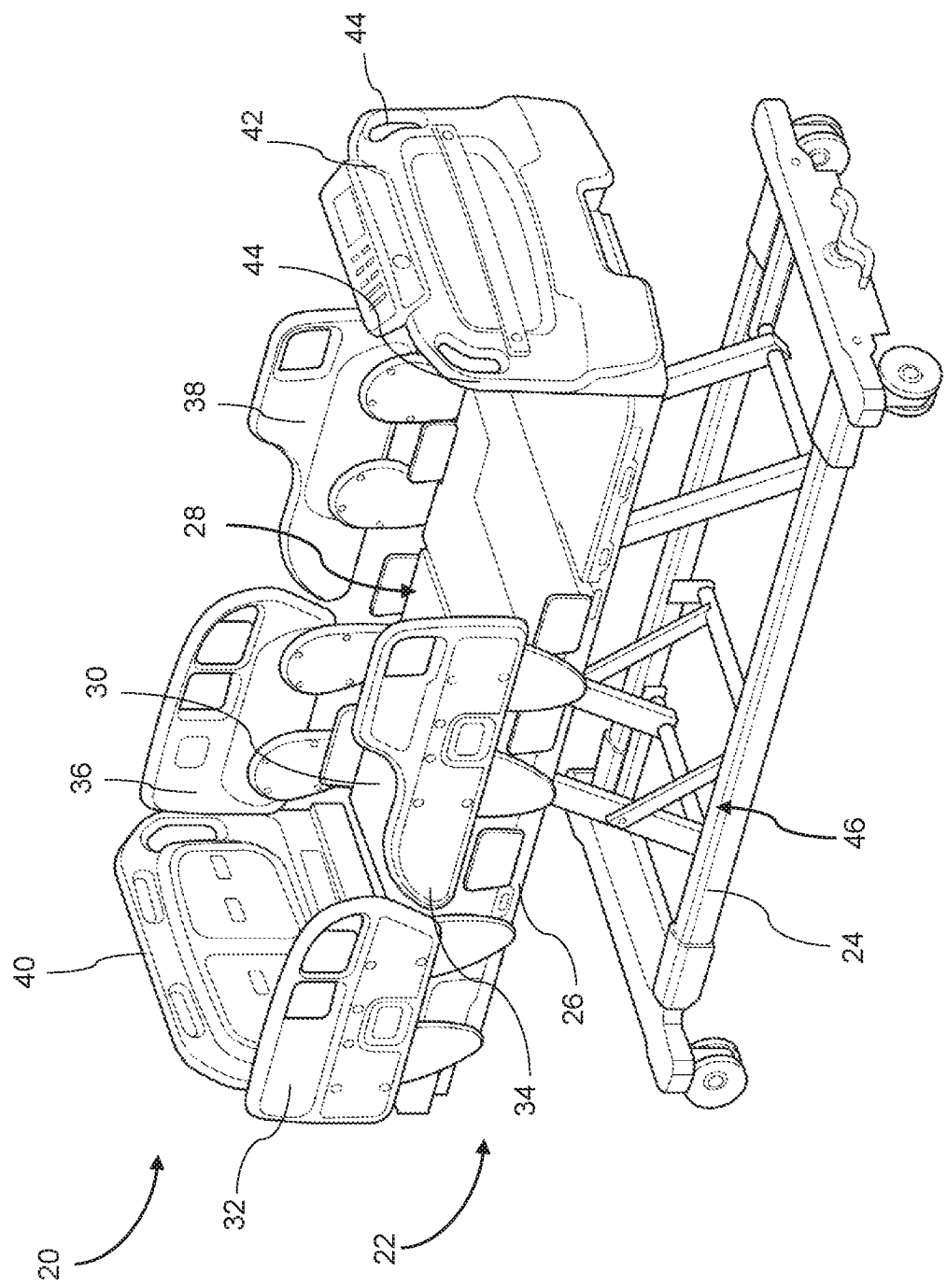
FIG. 1 is a perspective view of a patient support apparatus having a base supporting a patient support deck.

Referring now to FIG. 1, a patient support system realized as a patient support apparatus 20 is shown for supporting a patient in a health care setting. While the patient support apparatus 20 illustrated in FIG. 1 is realized as a hospital bed, it will be appreciated that the patient support apparatus 20 could be a stretcher, cot, table, wheelchair, or similar apparatus utilized in the care of a patient.

A support structure 22 provides support for the patient. The support structure 22 illustrated in FIG. 1 includes a base 24 and an intermediate frame 26. The intermediate frame 26 is spaced above the base 24. The support structure 22 also includes a patient support deck 28 disposed on the intermediate frame 26. The patient support deck 28 has several sections, some of which are pivotable relative to the intermediate frame 26, such as a fowler section, a seat section, a thigh section, and a foot section. The patient support deck 28 provides a patient support surface 30 upon which the patient is supported.

A mattress (not shown) is disposed on the patient support deck 28. The mattress has a secondary patient support surface upon which the patient is supported. The base 24, intermediate frame 26, patient support deck 28, and patient support surface 30 each have a head end and a foot end corresponding to designated placement of the patient's head and feet on the patient support apparatus 20. The construction of the support structure 22 may take on any known or conventional design, and is not limited to that specifically set forth above or depicted in the drawings. In addition, the mattress may be omitted in certain embodiments, such where patient rests directly on the patient support surface 30.

Side rails 32, 34, 36, 38 are coupled to the intermediate frame 26 and thereby supported by the base 24. A first side rail 32 is positioned at a right head end of the intermediate frame 26. A second side rail 34 is positioned at a right foot end of the intermediate frame 26. A third side rail 36 is positioned at a left head end of the intermediate frame 26. A fourth side rail 38 is positioned at a left foot end of the intermediate frame 26. The side rails 32, 34, 36, 38 are movable between a raised position in which they block ingress and egress into and out of the patient support apparatus 20, a lowered position in which they do not inhibit ingress and egress, and/or one or more intermediate positions therebetween. It will be appreciated that the patient support apparatus 20 may employ a different number of side rails, such as with a stretcher or a cot equipped with fewer side rails. Moreover, it will be appreciated that in certain configurations, the patient support apparatus 20 may not include any side rails.

As shown in FIG. 1, a headboard 40 and a footboard 42 are coupled to the intermediate frame 26. However, it will be appreciated that the headboard 40 and/or footboard 42 may be coupled to other locations on the patient support apparatus 20, such as the base 24, or may be omitted in certain embodiments.

One or more caregiver interfaces 44, such as handles, are shown integrated into the footboard 42 and the side rails 32, 34, 36, 38 to facilitate movement of the patient support apparatus 20 over floor surfaces. Additional caregiver interfaces 44 may be integrated into the headboard 40 and/or other components of the patient support apparatus 20. The caregiver interfaces 44 are graspable by the caregiver to manipulate the patient support apparatus 20 for movement. It will be appreciated that the caregiver interfaces 44 could be integrated with or operatively attached to any suitable portion of the patient support apparatus 20, or may be omitted in certain embodiments.

The patient support apparatus 20 may have numerous devices which include one or more movable members to perform a desired function. One such device is a lift device 46 that is coupled to the base 24 and to the intermediate frame 26 to lift and lower the patient between minimum and maximum heights of the patient support apparatus 20, and/or intermediate positions therebetween. In the embodiment shown, the lift device 46 includes a movable member in the form of a lift member for effecting height changes of the patient support apparatus 20. Additionally, the patient support apparatus 20 may have other devices which include one or more movable members arranged to perform a desired function, such as a deck adjustment device configured to raise and/or lower one or more of the patient support deck sections. The movable members in these devices may be movable relative to another fixed or stationary member of the patient support apparatus 20, or may be movable relative to another member that is also respectively movable. In some applications, the base 24 and/or the intermediate frame 26 may include the movable members. In these devices, one or more actuators 48 (see FIG. 2) are supported by the support structure 22. The actuators 48 are coupled to one or more of the movable members supported by the support structure 22. Here, the movable member is any member supported by the support structure 22 and movable relative to any other member on the patient support apparatus 20, and the other member can include stationary or fixed members, or movable members. While many different placements and uses of the actuators 48 are conceivable in connection with a single patient support apparatus 20, only certain illustrative embodiments will be described in detail herein.

Figure 2:
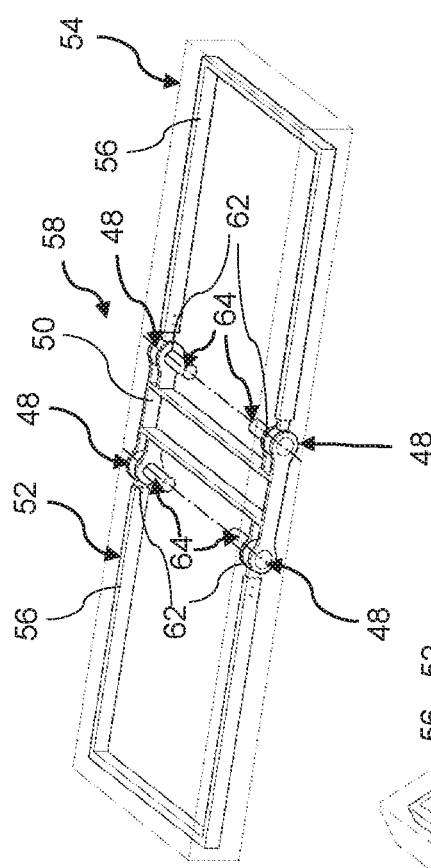
FIG. 2 is a perspective view of the patient support deck of FIG. 1 shown having a first member and a pair of movable members each operatively attached to the first member by an actuator drivable respective motors, with the movable members each shown in a first respective position.
Figure 3:
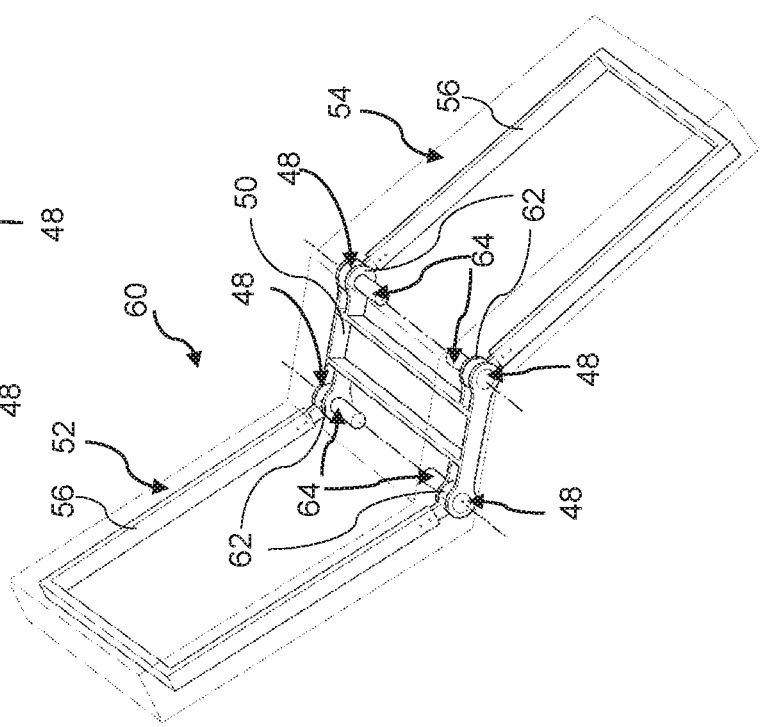
FIG. 3 is a perspective view of the patient support deck of FIG. 2 shown with the movable members each shown in a second respective position.

Referring now to FIGS. 2 and 3, in one embodiment, the patient support deck 28 includes a seat section 50 supported by the support structure 22. The patient support deck 28 further includes a fowler section 52 movably coupled to the seat section 50 and a foot section 54 movably coupled to the seat section 50, independent of the fowler section 52. In some embodiments, the seat section 50 is fixed to the intermediate frame 26. Actuators 48 are disposed between the fowler section 52 and the seat section 50 and between the foot section 54 and the seat section 50. The actuators 48 are configured to move the fowler section 52 and the foot section 54 relative to the seat section 50 and the intermediate frame 26. In this embodiment, the fowler section 52 and the foot section 54 are each realized as movable members 56 each respectively movable between at least a first position 58 shown in FIG. 2, a second position 60 shown in FIG. 3, and other positions therebetween. Here, the movable members 56 each move with respect to the seat section 50 which is realized as a first member 62. The fowler section 52 and foot section 54 may move concurrently or independently of each other. In the representative embodiment illustrated herein, four actuators 48 are shown; two for each movable member 56. However, it will be appreciated that a single actuator 48 could be used to move each respective movable member 56 such that only one actuator 48 could be employed to move the fowler section 52 and only one actuator 48 could be employed to move the foot section 54.

Referring now to FIGS. 2-11C, the actuator 48 is employed to effect movement of the movable member 56 with respect to the first member 62 of the patient support apparatus 20. To that end, in one embodiment, the actuator 48 includes a motor 64, a carrier 66, an input member 68, an output member 70, a reduction geartrain 72, and a clutch assembly 74. The motor 64 is employed to selectively provide a source of rotational torque. The carrier 66 is adapted to be secured to the first member 62 of the patient support apparatus 20. The input member 68 is rotatably supported by the carrier 66 and is coupled to the motor 64 for concurrent rotation. The output member 70 is rotatably supported by the carrier 66 and is adapted to be coupled to the movable member 56 of the patient support apparatus 20. The reduction geartrain 72 is rotatably supported by the carrier 66 between the input member 68 and the output member 70. The clutch assembly 74 is supported by the carrier 66, is disposed in selective torque-translating relationship between the reduction geartrain 72 and the output member 70, and is movable between an engaged configuration 74A (see FIG. 9A) and a disengaged configuration 74B (see FIG. 9B). When the clutch assembly 74 is in the engaged configuration 74A, rotational torque generated by the motor 64 is translated across the reduction geartrain 72 to move the movable member 56 with respect to the first member 62. When the clutch assembly 74 is in the disengaged configuration 74B, rotational torque is at least partially interrupted across the reduction geartrain 72 to allow movement of the movable member 56 independent of rotation of the motor 64. The motor 64, the carrier 66, the input member 68, the output member 70, the reduction geartrain 72, and the clutch assembly 74 will each be described in greater detail below.

As noted above, the motor 64 selectively generates rotational torque used to move the movable member 56 with respect to the first member 62 (compare FIGS. 2 and 3; motor depicted generically). To that end, the motor 64 rotates the input member 68 which, in turn, translates torque to the output member across the reduction geartrain 72 when the clutch assembly 74 is in the engaged configuration 74A, as described in greater detail below. It will be appreciated that a portion of the motor 64, such as an output shaft (not shown, but generally known in the art) could be coupled to the input member 68 in a number of different ways sufficient to translate rotational torque. Similarly, it will be appreciated that another portion of the motor 64, such as a motor housing (not shown, but generally known in the art) could be coupled to the carrier 66, or otherwise to a portion of the patient support apparatus 20, in a number of different ways sufficient to permit relative rotation of the motor 64. Furthermore, as will be appreciated from the subsequent description of the actuator 48 below, the motor 64 could be of any suitable type or configuration, such as an electric motor, a hydraulic motor, and the like.

Figure 4:
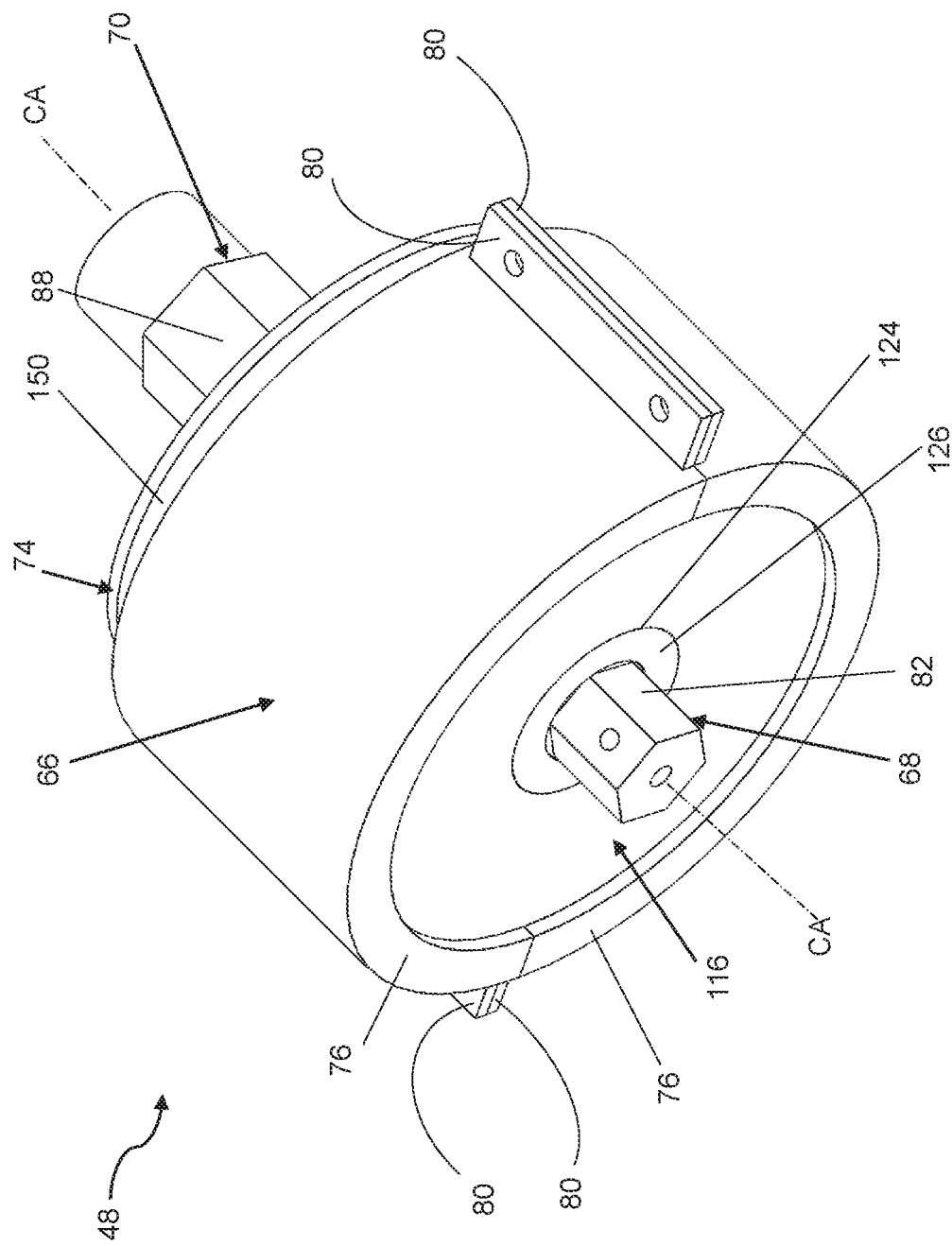
FIG. 4 is a perspective view of one of the actuators of FIGS. 2-3.
Figure 5:
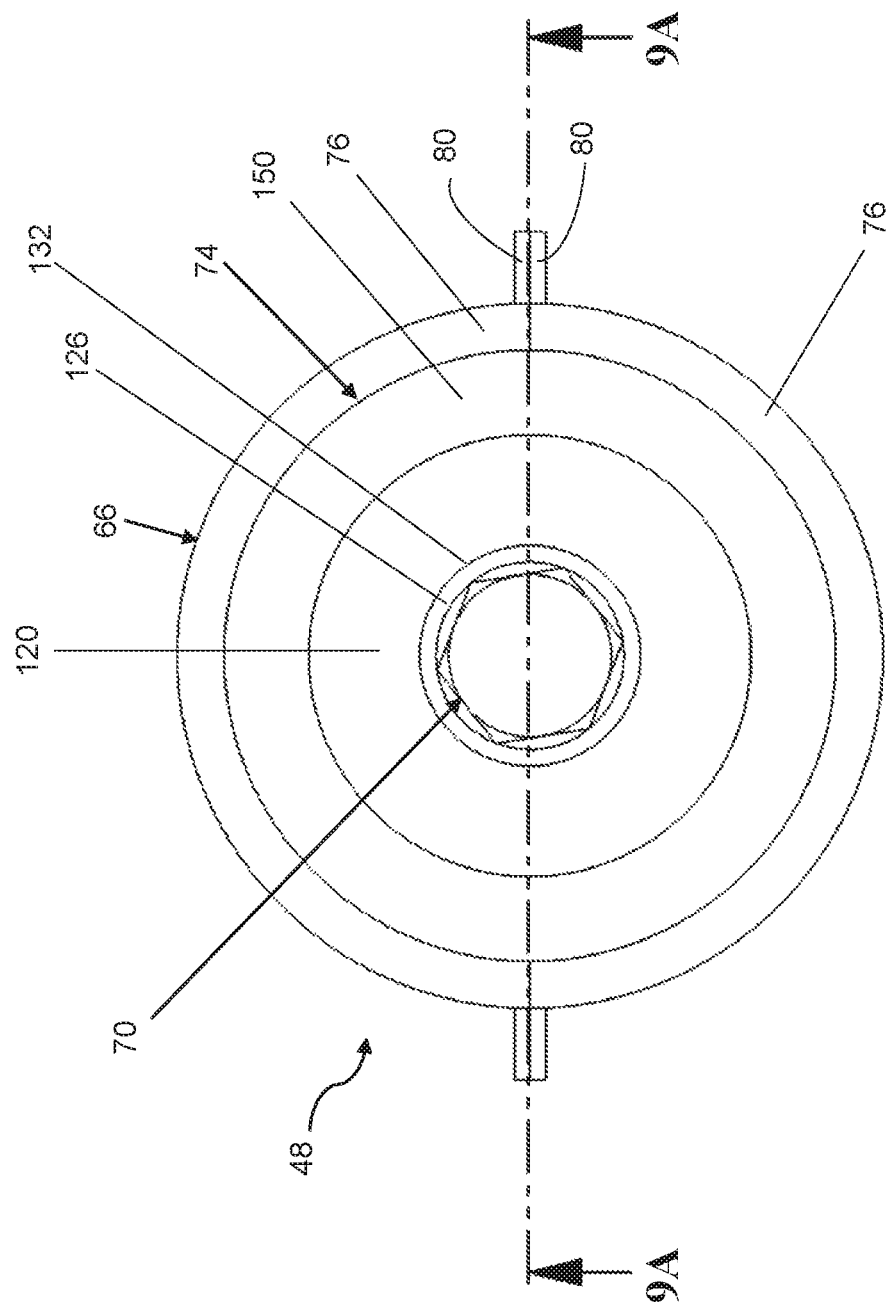
FIG. 5 is a top-side view of the actuator of FIG. 4.
Figure 6:
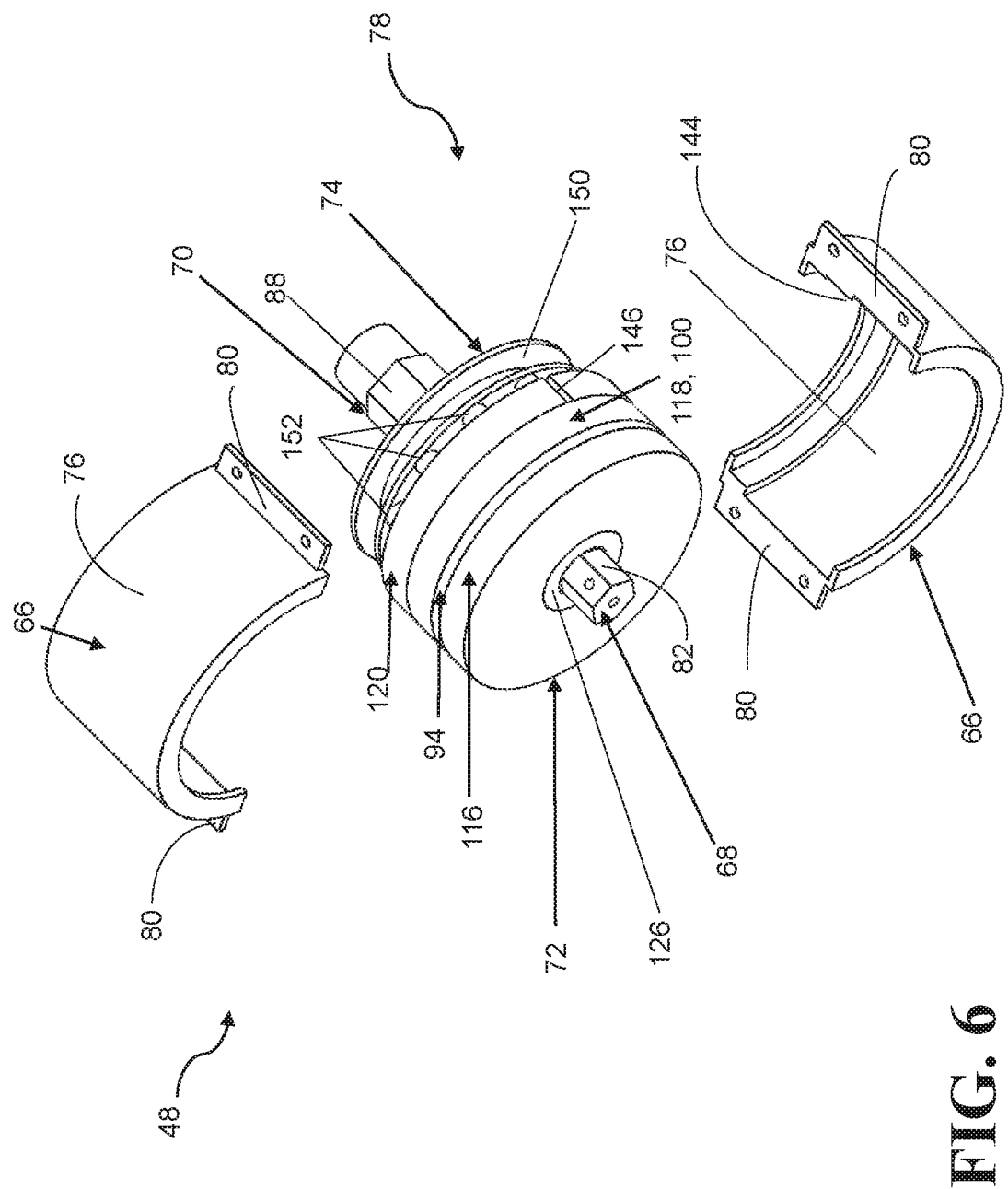
FIG. 6 is a partially-exploded perspective view of the actuator or FIGS. 4-5, the actuator shown having an actuator subassembly supported in a pair of carrier members.

Referring now to FIGS. 4-6, in one embodiment, the carrier 66 of the actuator 48 is formed as a pair of carrier members 76 which cooperate to support an actuator subassembly 78. Here, the actuator subassembly is defined by the reduction geartrain 72 and the clutch assembly 74. The carrier 66 has a generally cylindrical profile in which the actuator subassembly 78 is accommodated. In the representative embodiment illustrated herein, the carrier members 76 are advantageously designed symmetrically and each has tabs 80 adapted to secure the actuator 48 to the first member 62 of the patient support apparatus 20, such as with fasteners. However, it will be appreciated that the carrier 66 could be configured in a number of different ways and from any suitable number of components sufficient to support the carrier subassembly 78 and to be secured to the first member 62. It should be appreciated that other configurations and methods of mounting the actuators 48 are possible. Further, it will be appreciated that the actuators 48 may be mounted on components that are normally stationary, on the movable members, or on other components.

Referring now to FIGS. 7-9B, as is described in greater detail below, the reduction geartrain 72 illustrated herein employs a plurality of cycloidal gear arrangements which cooperate with the input member 68, the output member 70, and the carrier 66 to define a multi-stage cycloidal reduction geartrain. In certain embodiments, a single-stage cycloidal gear train may be utilized. One advantage of cycloidal geartrains (single or multi-stage) is the relatively small size compared to conventional linear actuators or similar devices. Another advantage of multi-stage cycloidal gear trains that have an even number of stages is that the input member 68 and the output member 70 rotate concentrically about a center axis C1, without relative eccentric motion between the input member 68 and the output member 70, which promotes a generally reduced packaging size of the actuator 48 and affords opportunities for advantageous positioning of the actuator 48 within the patient support apparatus 20. While the reduction geartrain 72 of the representative embodiment illustrated herein is a four-stage cycloidal geartrain, those having ordinary skill in the art will appreciate that the reduction geartrain 72 could be configured differently, with or without cycloidal gear arrangements. Specifically, it will be appreciated that the reduction geartrain 72 could employ a compound planetary gear arrangement (not shown, but generally known in the related art) configured to cooperate with the clutch assembly 74 to effect translation of torque from the input member 68 to the output member 70, as noted above.

As is best shown in FIGS. 8 and 10-11C, in one embodiment, the input member 68 has an input shaft 82 operatively attached to an input hub member 84 on which a first eccentric member 86 is formed. Here, the input shaft 82 and the input hub member 84 rotate about the center axis CA, and rotation of the input hub member 84 causes the first eccentric member 86 to "orbit" the center axis CA to effect eccentric movement of a portion of the reduction geartrain 72, as described in greater detail below. In the representative embodiment illustrated herein, the input member 68 is formed as a unitary, one-piece component so that the input shaft 82 and the input hub member 84 rotate together about the center axis CA during operation. The input shaft 82 has a hexagonal profile and is adapted to be coupled to the motor 64. The input hub member 84 has a generally disc-shaped profile, and the first eccentric member 86 has a generally cylindrical profile. However, it will be appreciated that the input shaft 82, the input hub member 84, and/or the first eccentric member 86 of the input member 68 could have any suitable profile, and could be formed as separate components operatively attached to each other in any suitable way.

The output member 70 has an output shaft 88 operatively attached to an output member ring gear hub, generally indicated at 90. Here too, both the output shaft 88 and the output member ring gear hub 90 rotate about the center axis CA. In the representative embodiment illustrated herein, the output member 70 is formed as a unitary, one-piece component so that the output shaft 88 and the output member ring gear hub 90 rotate together about the center axis CA during operation. The output shaft 88 has a hexagonal profile and is adapted to be coupled to the movable member 56 of the patient support apparatus 20. The output member ring gear hub 90 has a generally cylindrical profile and cooperates with a portion of the reduction geartrain 72 to effect translation of rotational torque, as noted above. It will be appreciated that the output shaft 88 and/or the output member ring gear hub 90 of the output member 70 could have any suitable profile, and could be formed as separate components operatively attached to each other in any suitable way. Moreover, it will be appreciated that the output member 70 could be realized by any suitable component of the actuator 48, arranged or otherwise positioned in any suitable way, depending on application requirements. By way of non-limiting example, the output member 70 could be realized as a ring gear, a hub, a carrier, a shaft, or any other suitable configuration sufficient to be rotatably supported by the carrier 66 and to be coupled to the movable member 56 of the patient support apparatus 20.

As noted above, the first eccentric drive member 86 of the input member 68, and the output member ring gear hub 90 of the output member 70, cooperate with the reduction geartrain 72 to translate torque from the input member 68 to the output member 70. To that end, in one embodiment, the reduction geartrain 72 has a primary gear member 92, a first ring gear plate 94, an intermediate member 96, a secondary gear member 98, and a second ring gear plate 100. The primary gear member 92 is rotatably supported about the first eccentric drive member 86 of the input member 68 for eccentric rotation about the center axis CA, as is described in greater detail below, and has a first gear 102 and a second gear 104. The first ring gear plate 94 is disposed in meshing relationship with the first gear 102 of the primary gear member 92. The intermediate member 96 has a second eccentric drive member 106 and an intermediate member ring gear hub 108. The intermediate ring gear hub 108 is disposed in meshing relationship with the second gear 104 of the primary gear member 92. The secondary gear member 98 is rotatably supported about the second eccentric drive member 106 of the intermediate member 96 for eccentric rotation about the center axis CA. The secondary gear member 98 has a third gear 110 and a fourth gear 112. Here, the third gear 110 of the secondary gear member 98 is disposed in meshing relationship with the second ring gear plate 100, and the fourth gear 112 of the secondary gear member 98 is disposed in meshing relationship with the output member ring gear hub 90 of the output member 70.

The first gear 102 of the primary gear member 92 is arranged to mesh with the first ring gear plate 94 in a cycloidal pattern of motion, and the second gear 104 of the primary gear member 92 is arranged to mesh with the intermediate member ring gear hub 108 in a cycloidal pattern of motion. Similarly, the third gear 110 of the secondary gear member 98 is arranged to mesh with the second ring gear plate 100 in a cycloidal pattern of motion, and the fourth gear 112 of the secondary gear member 98 is arranged to mesh with the output member ring hear hub 90 in a cycloidal pattern of motion.

The first gear 102 has a physical configuration different from the second gear 104. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, or any combination thereof. In other embodiments, the first gear 102 may have an identical configuration as the second gear 104. In the embodiment shown, the first gear 102 has a different number of teeth than the second gear 104, as described further below. The first gear 102 and the second gear 104 of the primary gear member 92 may be formed separately and mounted together or may be integrally formed as a unitary, one-piece component.

Similarly, the third gear 110 has a physical configuration different from the fourth gear 112. The difference in configuration may be attributed to one of tooth geometry, gear diameter, number of teeth, profile shift, extended/reduced addendums or dedendums, tooth depth, trichoid design, tooth alignment between gears, or any other physical quality a gear may have, or any combination thereof. In other embodiments, the third gear 110 may have an identical configuration as the fourth gear 112. In the embodiment shown, the third gear 110 has a different number of teeth than the fourth gear 112, as described further below. The third gear 110 and the forth gear 112 of the secondary gear member 98 may be formed separately and mounted together or may be integrally formed as a unitary, one-piece component.

In the representative embodiment illustrated herein, the primary gear member 92 and the secondary gear member 98 have the same size and configuration. Specifically, the first gear 102 and the third gear 110 have the same number of teeth, and the second gear 104 and the fourth gear 112 have the same number of teeth, as is described in greater detail below. However, it will be appreciated that the primary gear member 92 and the secondary gear member 98 could be sized or otherwise configured differently from each other.

The first ring gear plate 94 has $N_{RG1}$ internal teeth 94IN, the second ring gear plate 100 has $N_{RG2}$ internal teeth 100IN, the intermediate member ring gear hub 108 has $N_{RG3}$ internal teeth 108IN, the output member ring gear hub 90 has $N_{RG4}$ internal teeth 90IN, the first gear 102 has $N_{G1}$ external teeth 102EX, the second gear 104 has $N_{G2}$ external teeth 104EX, the third gear 110 has $N_{G3}$ external teeth 110EX, and the fourth gear 112 has $N_{G4}$ external teeth 112EX. In one embodiment, $N_{RG1}$ is different than at least one of $N_{G1}$ and $N_{RG3}$, and $N_{RG2}$ is different than at least one of $N_{G3}$ and $N_{RG4}$. In one embodiment, $N_{RG1}$ is greater than $N_{G1}$, and $N_{RG2}$ is greater than $N_{G3}$. In one embodiment, $N_{RG1}$, $N_{RG2}$, $N_{G2}$, and $N_{G4}$ are equal. In the representative embodiment illustrated herein, $N_{RG1}$, $N_{RG2}$, $N_{G2}$, and $N_{G4}$ are eleven; $N_{G1}$ and $N_{G3}$ are ten; and $N_{G2}$ and $N_{G4}$ are twelve. Thus, there is a one-tooth difference across each respective meshing engagement of the reduction geartrain 72. It will be appreciated that this arrangement contributes to the cycloidal patterns of motion noted above.

Figure 7:
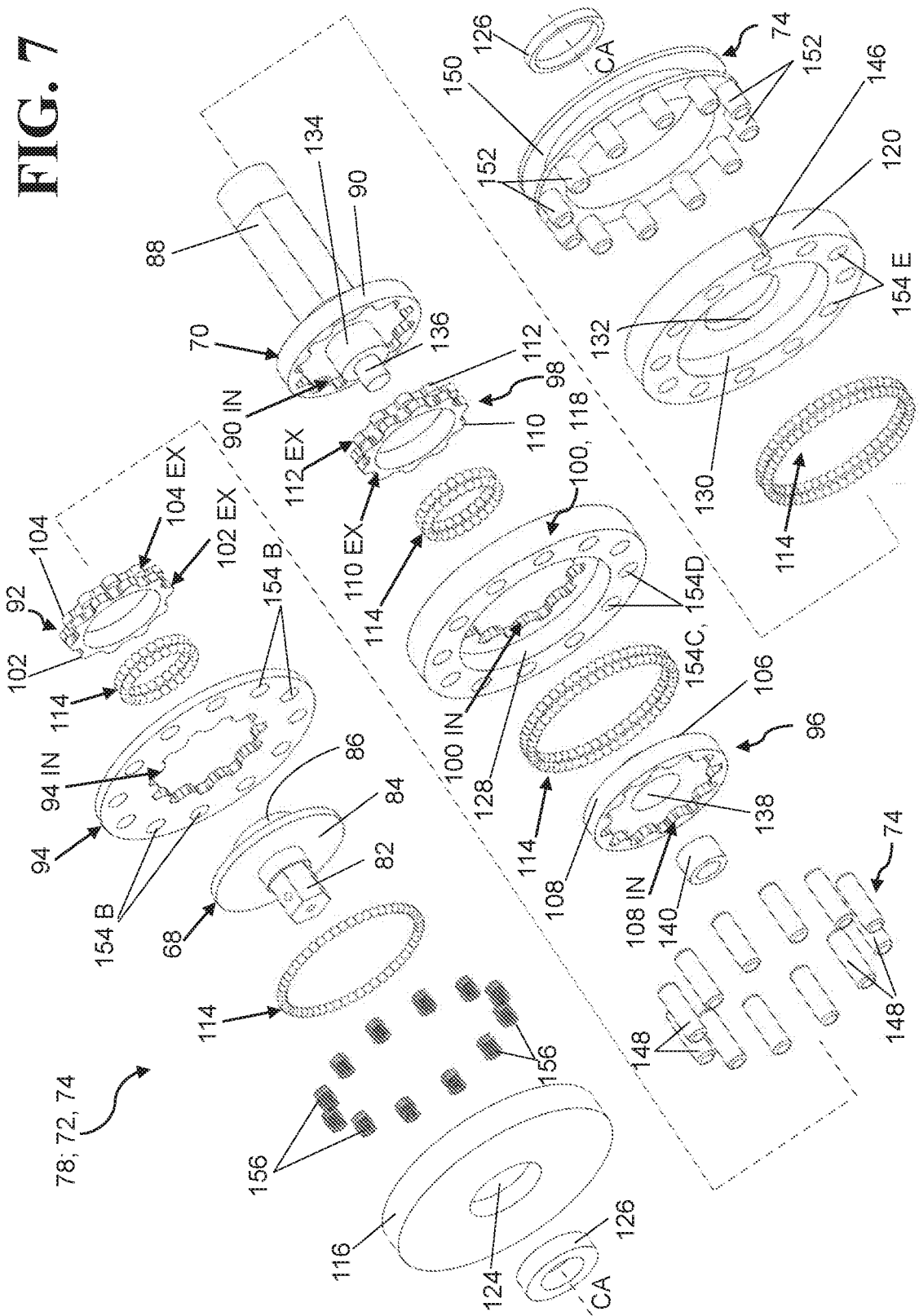
FIG. 7 is an exploded perspective view of the actuator subassembly of FIG. 6, the actuator subassembly shown having an input member, an output member, a reduction geartrain, and a clutch assembly.
Figure 8:
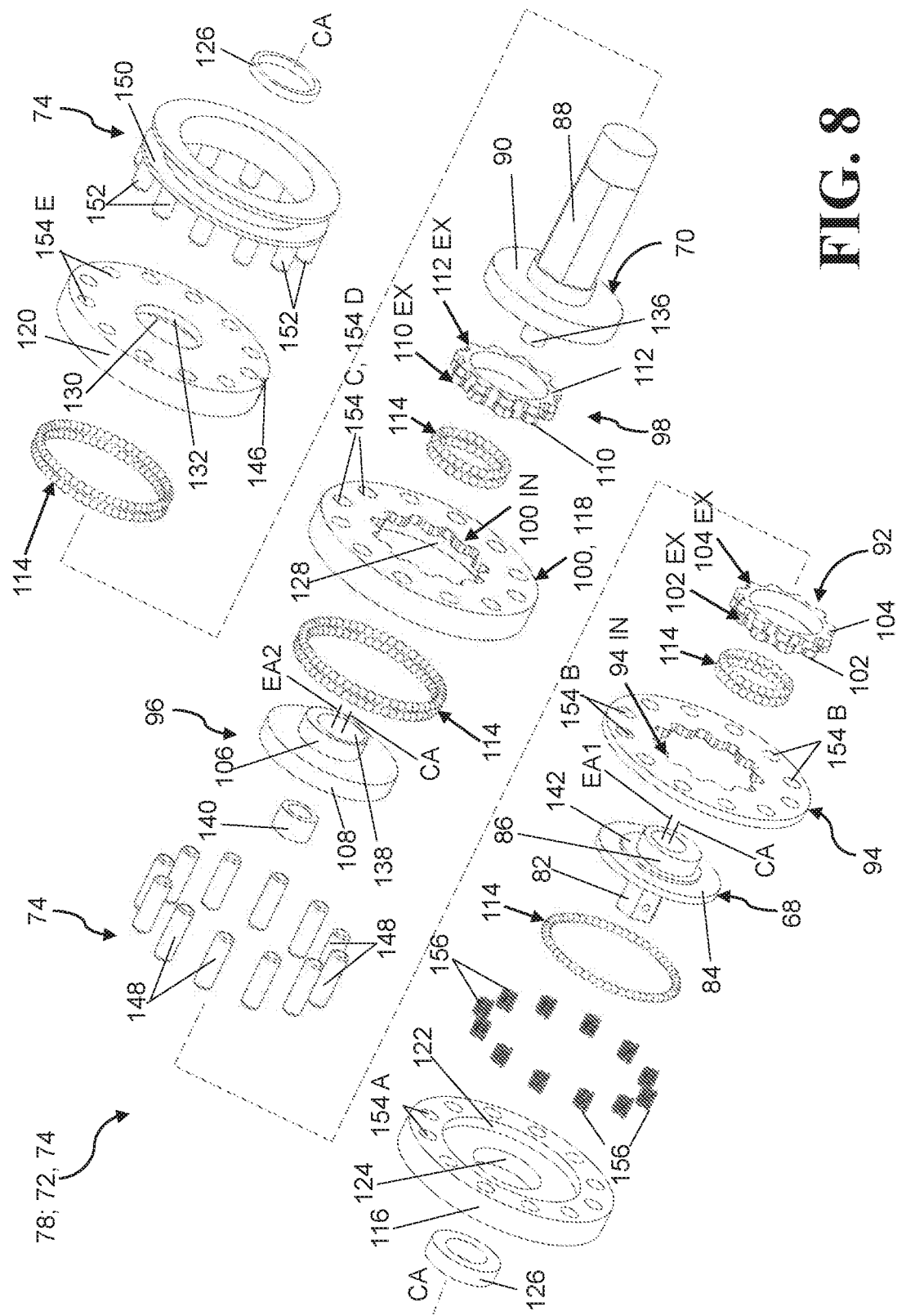
FIG. 8 is a rotated exploded perspective view of the actuator subassembly of FIG. 7.
Figure 9A:
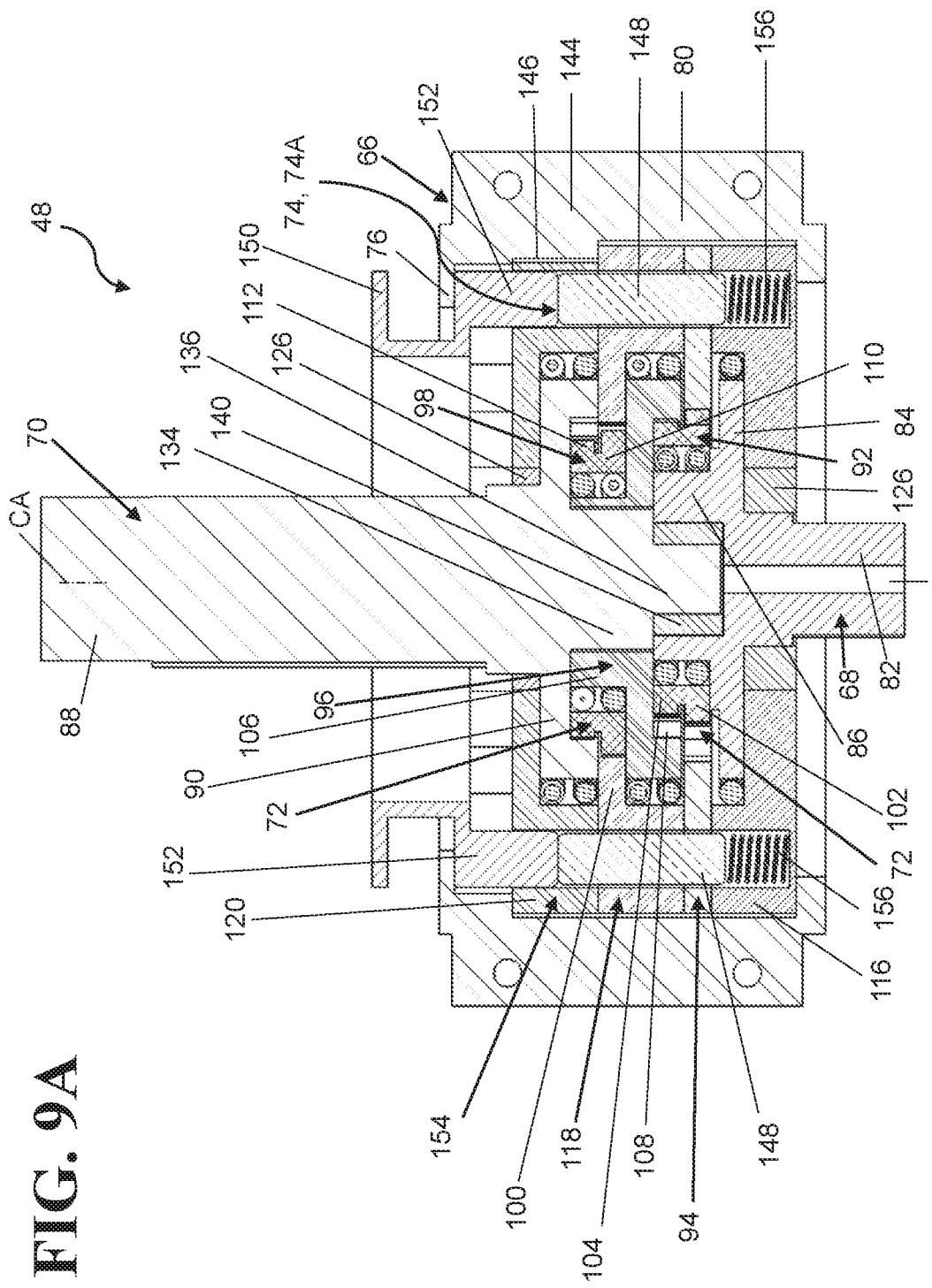
FIG. 9A is a sectional view of the actuator taken along line 9A-9A of FIG. 5 showing the input member, the output member, the reduction geartrain, and the clutch assembly depicted in FIGS. 7 and 8 supported in the carrier members of FIG. 6 and with the clutch assembly shown in an engaged configuration.
Figure 9B:
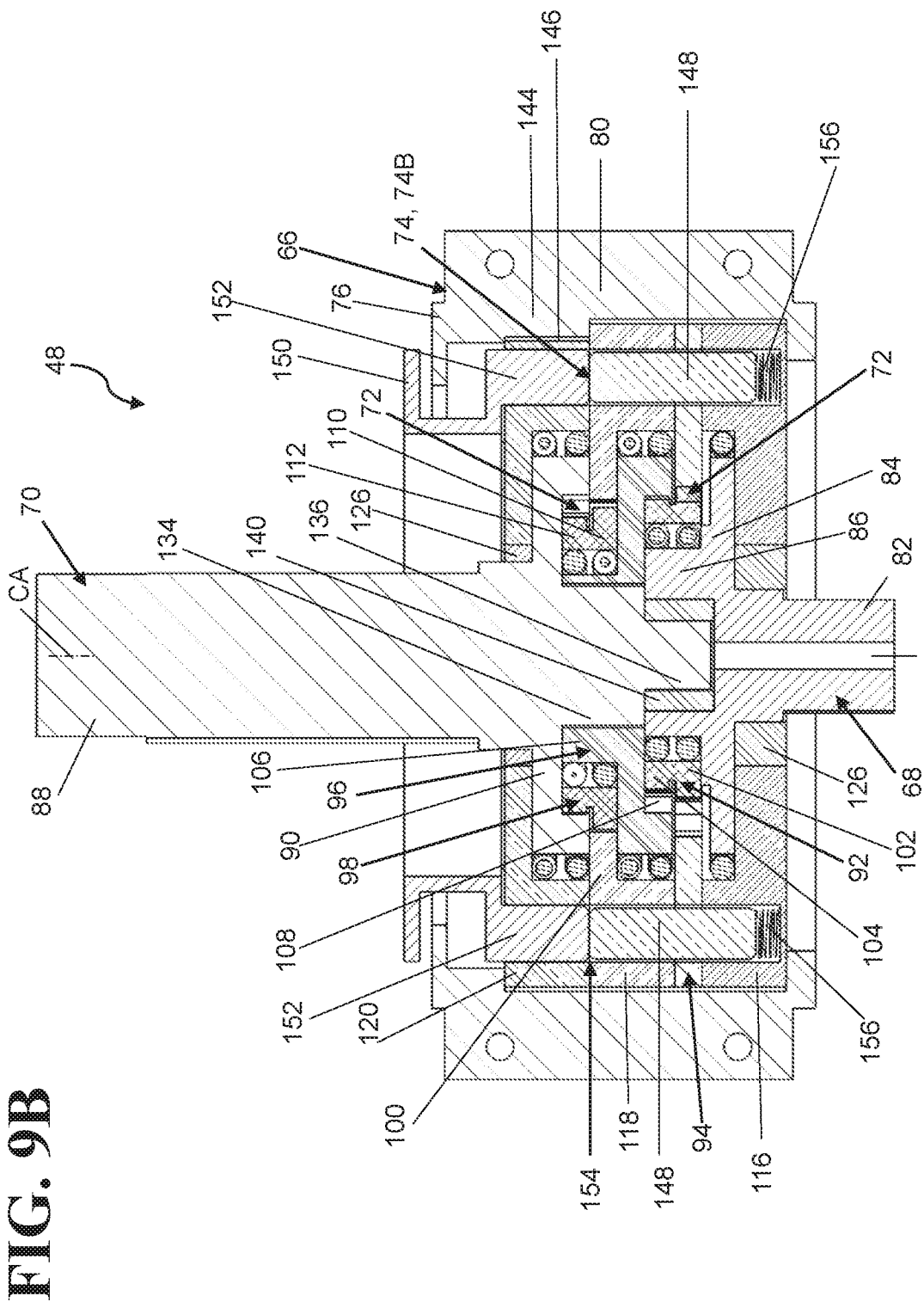
FIG. 9B is another sectional view of the actuator of FIG. 9A with the clutch assembly shown in a disengaged configuration.

With continued reference to FIGS. 7 and 8, the primary gear member 92 is rotatably supported about the first eccentric drive member 86 such that the first gear 102 and the second gear 104 rotate concurrently about a first eccentric axis EA1 which is spaced from the center axis CA. Similarly, the secondary gear member 98 is rotatably supported about the second eccentric drive member 106 such that the third gear 110 and the fourth gear 112 rotate concurrently about a second eccentric axis EA2 which is spaced from the center axis. In the representative embodiment herein, an arrangement of ball bearings, generally indicated at 114, is provided to support each gear member 92, 98 for rotation about the respective eccentric drive member 86, 106. Ball bearings 114 are also provided to support the input member 68, the intermediate member 96, and the output member 70 for rotation about the center axis CA, as described in greater detail below. It will be appreciated that the ball bearings 114 help reduce friction and promote smooth rotation between respective components in use, and can be configured in a number of different ways.

In one embodiment, the reduction geartrain 72 further includes a base hub 116, an intermediate hub 118, and a reduction hub 120. The base hub 116 is supported by the carrier 66 and supports the input member 68 for rotation. To that end, the base hub 116 has a stepped base hub pocket 122 in which ball bearings 114 ride to support the input hub member 84 of the input member 68 for rotation. The base hub 116 also has a base hub bore 124 formed concentrically with the stepped base hub pocket 122 and aligned about the center axis CA. The input shaft 82 of the input member 68 passes through the base hub bore 124 and is rotatably supported by a bushing, generally indicated at 126. It will be appreciated that the bushing 126 could alternatively be implemented as a bearing (not shown, but generally known in the related art).

The intermediate hub 118 is operatively attached to the second ring gear plate 100 and rotatably supports the intermediate member ring gear hub 108 of the intermediate member 96. Here, the intermediate hub 118 and the second ring gear plate 100 are formed as a unitary, one-piece component, but could alternatively be formed as separate components. The intermediate hub 118 has a stepped intermediate hub pocket 128 in which ball bearings 114 ride to support intermediate member ring gear hub 108 of the intermediate member 96 for rotation.

The reduction hub 120 is fixed to the carrier 66 and rotatably supports the output member ring gear hub 90 of the output member 70. Here, the reduction hub 120 has a stepped reduction hub pocket 130 in which ball bearings 114 ride to support the output member ring gear hub 90 of the output member 70 for rotation. The reduction hub 120 also has a reduction hub bore 132 formed concentrically with the stepped reduction hub pocket 130 and aligned about the center axis CA. The output shaft 88 of the output member 70 passes through the reduction hub bore 132 and is rotatably supported by another bushing 126.

In one embodiment, the output member 70 is further rotatably supported by the intermediate member 96 and the input member 68. To that end, as shown best in FIGS. 7 and 9A-9B, the output member 70 has a brace shaft 134 which extends from the output member ring gear hub 90, and a pilot shaft 136 which extends from the brace shaft 134. Both the brace shaft 134 and the pilot shaft 136 extend away from the output shaft 88 and are aligned about the center axis CA.

The brace shaft 134 passes through and is rotatably supported within an intermediate bore 138 formed in the intermediate member 96. Similarly, the pilot shaft 136 is rotatably supported by a pilot bushing 140 which, in turn, is rotatably supported in an input bore 142 formed in the input member 68. Here, the input bore 142 and the pilot bushing 140 are likewise aligned about the center axis CA.

Figure 10:
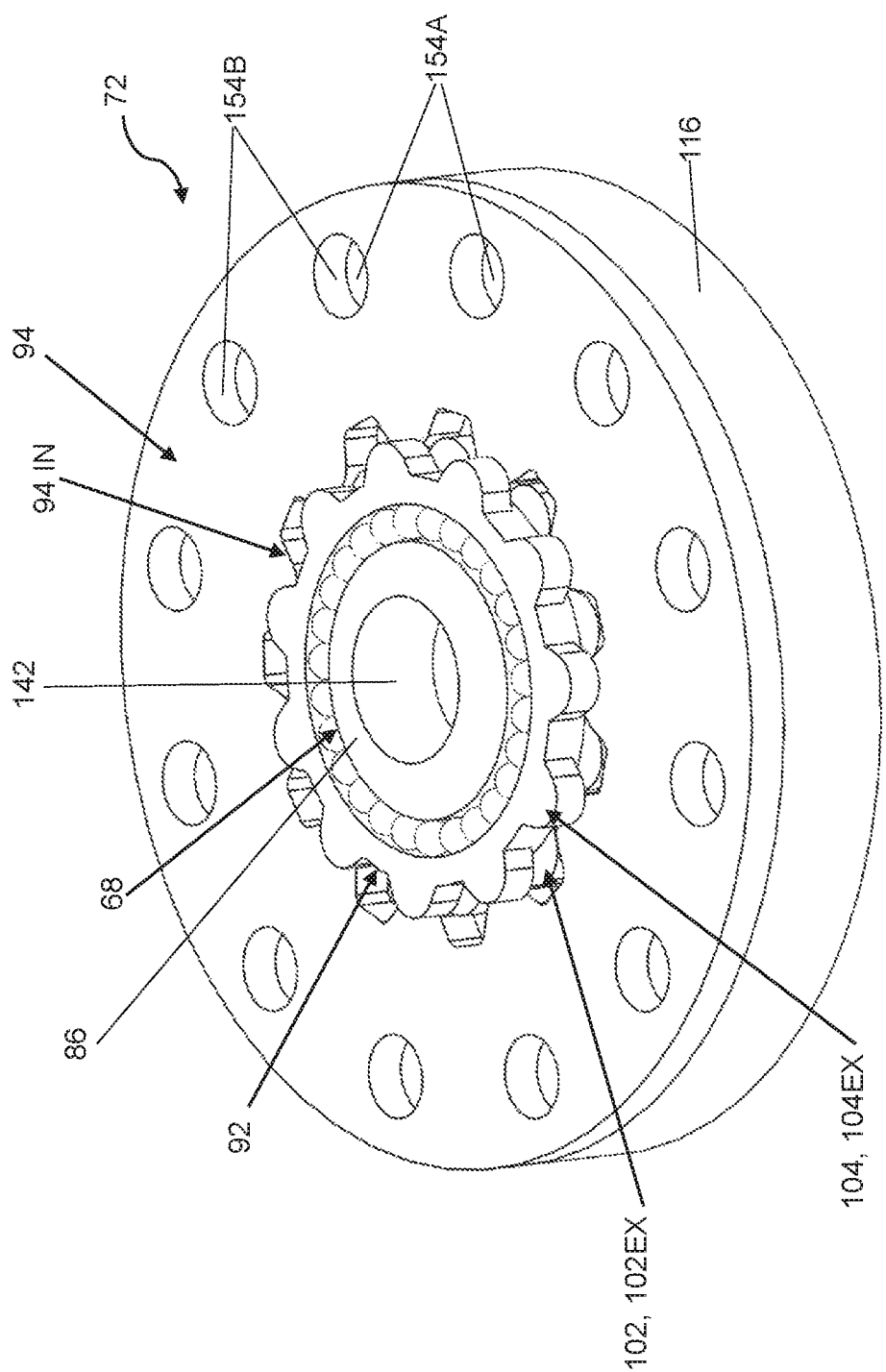
FIG. 10 is a perspective view of the input member and a portion of a cycloidal gear arrangement of the reduction geartrain of FIGS. 7-9B.
Figure 11A:
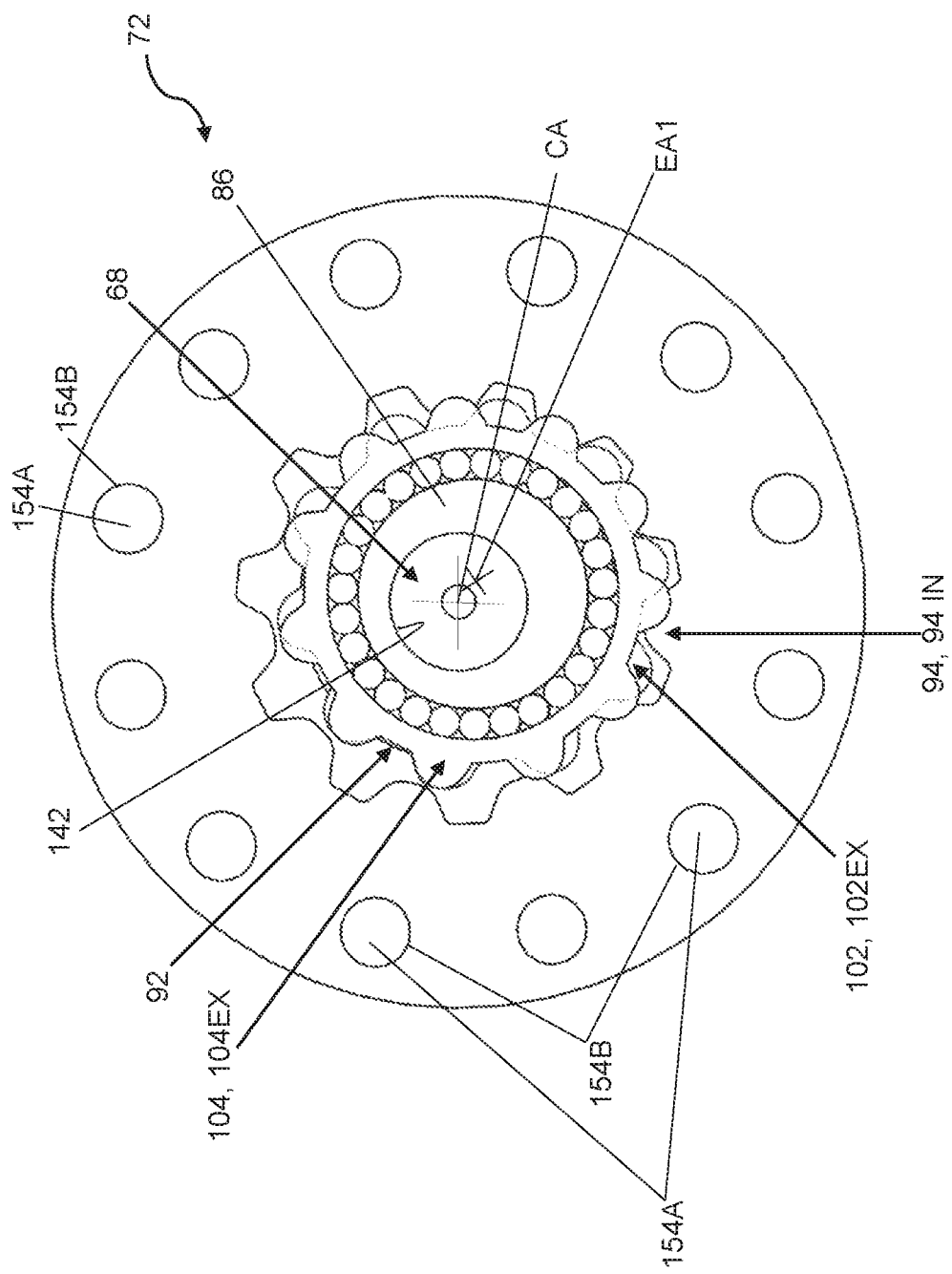
FIG. 11A is a top-side view of the input member and cycloidal gear arrangement of FIG. 10 shown in a first eccentric cycloidal position.
Figure 11B:
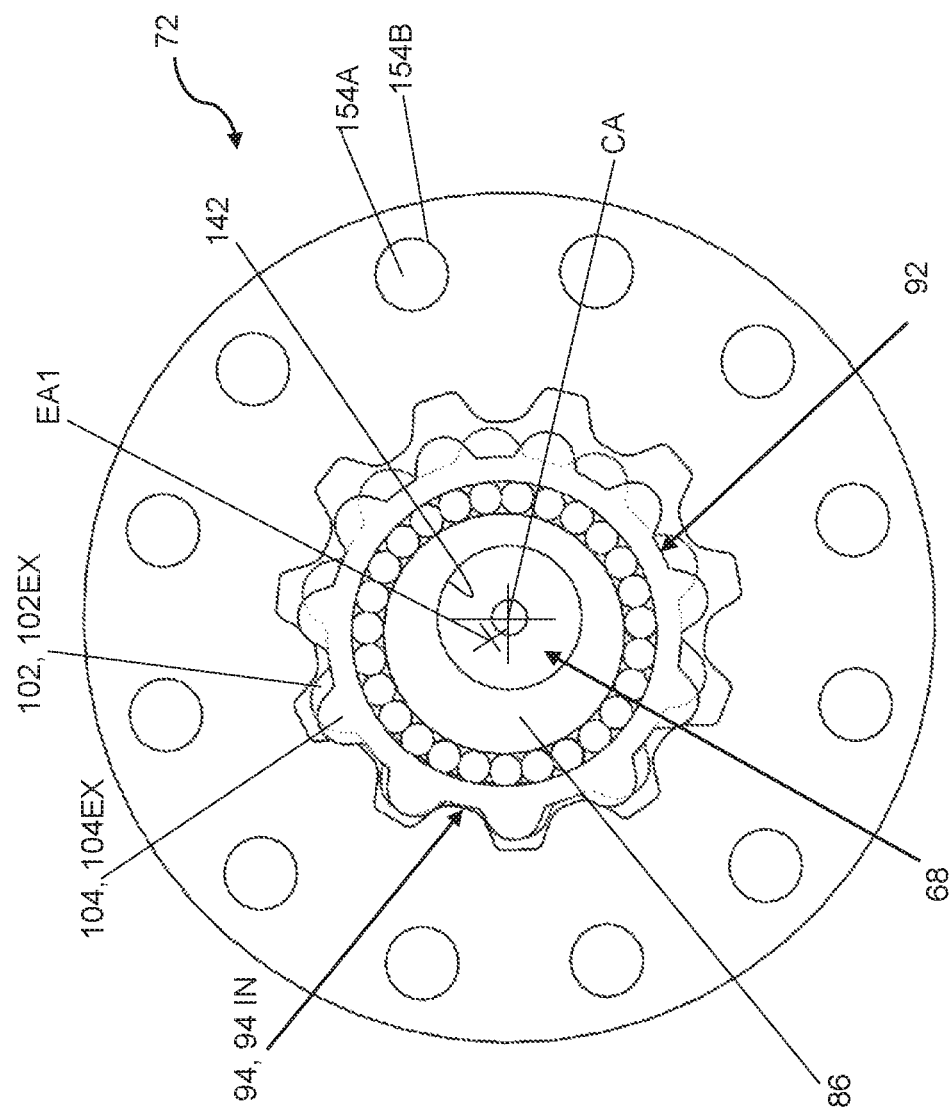
FIG. 11B is another top-side view of the input member and cycloidal gear arrangement of FIGS. 10-11A shown in a second eccentric cycloidal position.
Figure 11C:
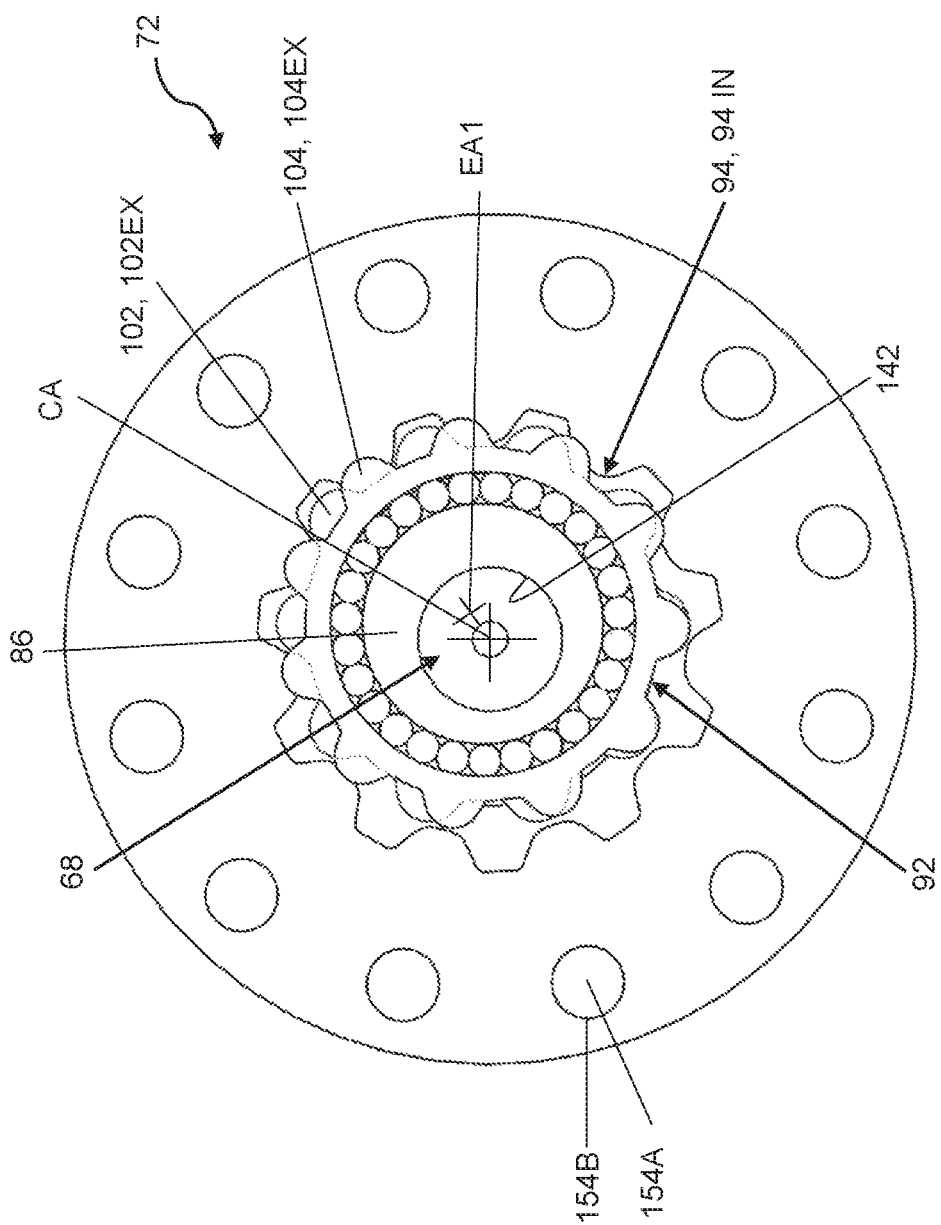
FIG. 11C is another top-side view of the input member and cycloidal gear arrangement of FIGS. 10-11B shown in a third eccentric cycloidal position.

As is best depicted in FIGS. 10-11C, rotation of the input member 68 along the center axis CA effects eccentric rotation of the primary gear member 92 about the first eccentric drive member 86 along the first eccentric axis EA1 which, in turn, effects a cycloidal pattern of movement between the first gear 102 and the first ring gear plate 94 as the external teeth 102EX of the first gear 102 mesh with and engage the internal teeth 94IN of the first ring gear plate 94 (compare FIGS. 11A-11C). Because the first gear 102 and the second gear 104 of the primary gear member 92 rotate concurrently about the first eccentric axis EA1 in response to rotation of the input member 68, relative rotation of the input member 68 along the center axis CA effects a cycloidal pattern of movement between the second gear 104 and the intermediate member ring gear hub 108 as the external teeth 104EX of the second gear 104 mesh with and engage the internal teeth 108IN of the intermediate member ring gear hub 108. It will be appreciated that the intermediate member ring gear hub 108 rotates about the center axis CA in response to the cycloidal pattern of movement of the second gear 104 of the primary gear member 92. Thus, rotation of the intermediate member 96 along the center axis CA effects eccentric rotation of the secondary gear member 98 about the second eccentric drive member 106 along the second eccentric axis EA2 which, in turn, effects a cycloidal pattern of movement between the third gear 110 and the second ring gear plate 100 as the external teeth 110EX of the third gear 110 mesh with and engage the internal teeth 100IN of the second ring gear plate 100. Here too, because the third gear 110 and the fourth gear 112 of the secondary gear member 98 rotate concurrently about the second eccentric axis EA2 in response to rotation of the intermediate member 96, relative rotation of the intermediate member 96 along the center axis CA effects a cycloidal pattern of movement between the fourth gear 112 and the output member ring gear hub 90 as the external teeth 112EX of the fourth gear 112 mesh with and engage the internal teeth 90IN of the output member ring gear hub 90. It will be appreciated that the output member ring gear hub 90 rotates about the center axis CA in response to the cycloidal pattern of movement of the fourth gear 112 of the secondary gear member 98.

As noted above, the reduction hub 120 is fixed to the carrier 66. To that end, in the representative embodiment illustrated herein, the carrier 66 includes a key 144 which is accommodated within a keyway 146 formed in the reduction hub 120, which prevents relative rotation between the reduction hub 120 and the carrier 66 in use and as the clutch assembly 74 moves between the configurations 74A, 74B. Conversely, the base hub 116, the first ring gear plate 94, the second ring gear plate 100, and the intermediate hub 118 are rotatably supported by the carrier 66 and can rotate with respect to the reduction hub 120 and the carrier 66 when the clutch assembly 74 is in the disengaged configuration 74B (see FIG. 9B). However, when the clutch assembly 74 is in the engaged configuration 74A (see FIG. 9A), the base hub 116, the first ring gear plate 94, the second ring gear plate 100, and the intermediate hub 118 are rotatably fixed to the reduction hub 120 by the clutch assembly 74. As is explained in greater detail below, the clutch assembly 74 is biased towards the engaged configuration 74A, where torque is translated across the reduction geartrain 72 between the input member 68 and the output member 70, and may be selectively moved to the disengaged configuration 74B so as to at least partially bypass the reduction geartrain 72.

When the clutch assembly 74 is in the engaged configuration 74A, rotational torque generated by the motor 64 can be used to move the movable member 56 with respect to the first member 62 at a reduction gear ratio defined by the specific configuration of the reduction geartrain 72. Advantageously, torque generated by the motor 64 is increased significantly across the reduction geartrain 72. It will be appreciated that this configuration helps keep the movable member 56 positioned relative to the first member 62 in operation, such as during patient use. However, when the clutch assembly 74 is selectively moved to the disengaged configuration 74B, the reduction geartrain 72 is at least partially bypassed so as to allow for relative movement between the input member 68 and the output member 70 at a different gear ratio. Advantageously, when the clutch assembly 74 is in the disengaged configuration 74B, the actuator 48 allows the output member 70 to be rotated independent of the input member 68 and, thus, the motor 64. It will be appreciated that this configuration allows the movable member 56 to be adjusted or otherwise repositioned with respect to the first member 62 both quickly and efficiently when the clutch assembly 74 is moved to the disengaged configuration 74B.

In order to effect movement between the configurations 74A, 74B of the clutch assembly 74 noted above, in one embodiment, the clutch assembly 74 has at least one pin member 148 and a release member 150. The release member 150 is at least partially supported in the carrier 66, is realized as a generally hollow-cylindrical hub, and has at least one shaft 152 which extends outwardly. Here, the base hub 116, the first ring gear plate 94, the second ring gear plate 100, the intermediate hub 118, and the reduction hub 120 each have at least one guide 154A, 154B, 154C, 154D, 154E formed therein. The respective at least one guides 154A (of the base hub 116), 154B (of the first ring gear plate 94), 154C (of the second ring gear plate 100), 154D (of the intermediate hub 118), 154E (of the reduction hub 120) each at least partially accommodate the at least one pin member 148 when the clutch assembly 74 is in the engaged configuration. Moreover, the at least one shaft 152 of the release member 150 is arranged at least partially within the at least one guide 154D of the reduction hub 120 when the clutch assembly 74 is in both the engaged configuration 74A and the disengaged configuration 74B, as described in greater detail below.

In the representative embodiment illustrated throughout the drawings, corresponding pluralities of pin members 148, shafts 152, and guides 154 are provided, radially and equidistantly spaced about the center axis CA. Specifically, a total of twelve pin members 148 and twelve shafts 152 are provided for respective accommodation within twelve corresponding guides 154 formed in each of the base hub 116, the first ring gear plate 94, the second ring gear plate 100, the intermediate hub 118, and the reduction hub 120. However, those having ordinary skill in the art will appreciate that any suitable number or arrangement of pin members 148, shafts 152, and/or guides 154 could be utilized.

As noted above, the clutch assembly 74 is biased towards the engaged configuration 74A. To that end, in one embodiment, the clutch assembly 74 employs at least one biasing element 156 supported between the at least one pin member 148 and the base hub 116 (see FIGS. 9A-9B). In the representative embodiment illustrated herein, the biasing element 156 is realized as a cylindrical compression spring, but could have any suitable configuration. The biasing element 156 is arranged to urge the at least one pin member 148 towards the at least one shaft 152 of the release member 150. More specifically, respective biasing elements 156 are arranged to urge corresponding pin members 148 into abutment with the respective shafts 152 of the release member 150 when the clutch assembly 74 is in the engaged configuration 74A. Moreover, the biasing elements 156 urge the pin members 148 at least partially into the respective guides 154E of the reduction hub 120 when the clutch assembly 74 is in the engaged configuration 74A, thereby rotatably locking the base hub 116, the first ring gear plate 94, the second ring gear plate 100, and the intermediate hub 118 to the reduction hub 120 until a force is applied to the release member 150. The force is translated to the pin members 148 via the shafts 152 which, in turn, causes the pin members 148 to compress the respective biasing elements 156 and to move out of the guides 154E of the reduction hub 120 when the clutch assembly 74 is in the disengaged configuration 74B such that the base hub 116, the first ring gear plate 94, the second ring gear plate 100, and the intermediate hub 118 can each rotate with respect to the reduction hub 120.

Thus, it will be appreciated that the actuator 48 affords significant advantages for use in connection with patient support apparatuses 20 in that the clutch assembly 74 can be selectively actuated to facilitate quick re-positioning of the movable member 56 with respect to the first member 62 without use of the motor 64. Specifically, those having ordinary skill in the art will appreciate that the configuration of the actuator 48 allows the use of reduction geartrains 72 configured with a high gear ratio to translate rotational torque from the motor 64 to drive the movable member 56, which promotes rigidity between the movable member 56 and the first member 62 in use, without compromising the ability to quickly move the movable member 56 with respect to the first member 62. Thus, the clutch assembly 74 can be manually actuated by hand or mechanically, such as with a solenoid and/or linkage (not shown, but generally known in the related art), to move the movable member 56 faster than may otherwise be accomplished by driving the motor 64, such as during a critical event (for example, when a patient is in cardiac arrest and requires CPR). Moreover, it will be appreciated that the actuator 48 affords significant advantages relating to manufacturing and assembly costs of patient support apparatuses 20 by reducing the relative size, cost, complexity, and packaging space required of the components of the actuator 48, such as the motor 64 and the reduction geartrain 72.

As previously described, the patient support apparatus 20 may have numerous devices that comprise one or more movable members that need to be moved to perform a desired function. The actuator 48 described can be used to cause movement of such movable members. Although the actuator 48 could be used in many different types of devices present on the patient support apparatus 20. Specifically, in other embodiments (not shown), the actuator 48 described herein may be used anywhere in the patient support apparatus 20 including driving wheels, side rails, footboard, headboard, or any other movable component of the patient support apparatus 20. The gears and other components of the actuator 48 could be formed of metal, plastic, other suitable materials, or combinations thereof. Likewise, the movable members 56 could be formed of metal, plastic, other suitable materials, or combinations thereof.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. An actuator for use in effecting movement of a movable member with respect to a first member of a patient support apparatus, said actuator comprising:
   a motor for providing a source of rotational torque;
   a carrier adapted to be secured to the first member of the patient support apparatus;
   an input member rotatably supported by said carrier and coupled to said motor for concurrent rotation;
   an output member rotatably supported by said carrier and adapted to be coupled to the movable member of the patient support apparatus;
   a reduction geartrain supported by said carrier between said input member and said output member; and
   a clutch assembly supported by said carrier, disposed in selective torque-translating relationship between said reduction geartrain and said output member, and moveable between:
      an engaged configuration wherein rotational torque generated by said motor is translated across said reduction geartrain to move the movable member with respect to the first member, and
      a disengaged configuration wherein rotational torque is at least partially interrupted across said reduction geartrain to allow movement of the movable member independent of rotation of said motor.

2. The actuator as set forth in claim 1, wherein said reduction geartrain includes at least one cycloidal gear arrangement.

3. The actuator as set forth in claim 1, wherein said reduction geartrain includes a plurality of cycloidal gear arrangements which cooperate to define a multi-stage cycloidal reduction geartrain.

4. The actuator as set forth in claim 3, wherein said multi-stage cycloidal reduction geartrain has an even number of stages such that both said input member and output member rotate about a center axis defined by rotation of said motor.

5. The actuator as set forth in claim 1, wherein said input member has a first eccentric drive member rotatable about a center axis defined by rotation of said motor; and wherein said output member includes an output member ring gear hub rotatable about said center axis.

6. The actuator as set forth in claim 5, wherein said reduction geartrain includes:
   a primary gear member rotatably supported about said first eccentric drive member of said input member for eccentric rotation about said center axis, said primary gear member having first and second gears;
   a first ring gear plate disposed in meshing relationship with said first gear of said primary gear member;
   an intermediate member having a second eccentric drive member and an intermediate member ring gear hub with said intermediate member ring gear hub disposed in meshing relationship with said second gear of said primary gear member;
   a secondary gear member rotatably supported about said second eccentric drive member of said intermediate member for eccentric rotation about said center axis, said secondary gear member having third and fourth gears with said fourth gear disposed in meshing relationship with said output member ring gear hub; and
a second ring gear plate disposed in meshing relationship with said third gear of said secondary gear member.

7. The actuator as set forth in claim 6, wherein said first gear of said primary gear member is arranged to mesh with said first ring gear plate in a cycloidal pattern of motion; and
wherein said second gear of said primary gear member is arranged to mesh with said intermediate member ring gear hub in a cycloidal pattern of motion.

8. The actuator as set forth in claim 6, wherein said third gear of said secondary gear member is arranged to mesh with said second ring gear plate in a cycloidal pattern of motion; and
wherein said fourth gear of said secondary gear member is arranged to mesh with said output member ring gear hub in a cycloidal pattern of motion.

9. The actuator as set forth in claim 6, wherein said first ring gear plate has $N_{RG1}$ internal teeth, said second ring gear plate has $N_{RG2}$ internal teeth, said intermediate member ring gear hub has $N_{RG3}$ internal teeth, said output member ring gear hub has $N_{RG4}$ internal teeth, said first gear has $N_{G1}$ external teeth, said second gear has $N_{G2}$ external teeth, said third gear has $N_{G3}$ external teeth, and said fourth gear has $N_{G4}$ external teeth.

10. The actuator as set forth in claim 9, wherein $N_{RG1}$ is different than at least one of $N_{G1}$ and $N_{RG3}$.

11. The actuator as set forth in claim 9, wherein $N_{RG1}$ is greater than $N_{G1}$.

12. The actuator as set forth in claim 9, wherein $N_{RG2}$ is different than at least one of $N_{G3}$ and $N_{RG4}$.

13. The actuator as set forth in claim 9, wherein $N_{RG2}$ is greater than $N_{G3}$.

14. The actuator as set forth in claim 9, wherein $N_{RG1}$, $N_{RG2}$, $N_{G2}$, and $N_{G4}$ are equal.

15. The actuator as set forth in claim 6, wherein said reduction geartrain further includes:
a base hub supported by said carrier and rotatably supporting said input member;
an intermediate hub operatively attached to said second ring gear plate and rotatably supporting said intermediate member ring gear hub of said intermediate member; and
a reduction hub fixed to said carrier and rotatably supporting said output member ring gear hub of said output member.

16. The actuator as set forth in claim 15, wherein said base hub, said first ring gear plate, said second ring gear plate, and said intermediate hub are rotatably supported by said carrier.

17. The actuator as set forth in claim 15, wherein said base hub, said first ring gear plate, said second ring gear plate, and said intermediate hub can rotate with respect to said reduction hub and said carrier when said clutch assembly is in said disengaged configuration; and
wherein said base hub, said first ring gear plate, and said intermediate hub are rotatably fixed to said reduction hub when said clutch assembly is in said engaged configuration.

18. The actuator as set forth in claim 15, wherein said clutch assembly includes at least one pin member; and
wherein said base hub, said first ring gear plate, said second ring gear plate, said intermediate hub, and said reduction hub each have at least one guide formed therein, said at least one guide at least partially accommodating said at least one pin member when said clutch assembly is in said engaged configuration.

19. The actuator as set forth in claim 18, wherein said clutch assembly further includes a release member at least partially supported in said carrier, said release member having at least one shaft arranged at least partially within said at least one guide of said reduction hub.

20. The actuator as set forth in claim 19, wherein each of said base hub, said first ring gear plate, said second ring gear plate, said intermediate hub, and said reduction hub each includes a respective plurality of said guides, said clutch assembly includes a corresponding plurality of said pin members, and said release member of said clutch assembly includes a corresponding plurality of shafts.

21. The actuator as set forth in claim 18, wherein said clutch assembly further includes at least one biasing element supported between said at least one pin member and said base hub, said at least one biasing element arranged to urge said at least one pin member towards said at least one shaft of said release member.

22. The actuator as set forth in claim 21, wherein said at least one biasing element urges said at least one pin member into abutment with said at least one shaft of said release member when said clutch assembly is in said engaged configuration.

23. The actuator as set forth in claim 21, wherein said at least one biasing element urges said at least one pin member at least partially into said at least one guide of said reduction hub when said clutch assembly is in said engaged configuration; and
wherein a force applied to said release member is translated to said at least one pin member via said at least one shaft and causes said at least one pin member to compress said at least one biasing element and to move out of said at least one guide of said reduction hub when said clutch assembly is in said disengaged configuration such that said base hub, said first ring gear plate, said second ring gear plate, and said intermediate hub can rotate with respect to said reduction hub.

24. A patient support apparatus comprising:
a first member;
a movable member movable relative to said first member; and
an actuator coupled to said movable member to move said movable member relative to said first member, said actuator including:
a motor for providing a source of rotational torque;
a carrier operatively attached to said first member;
an input member rotatably supported by said carrier and coupled to said motor for concurrent rotation;
an output member rotatably supported by said carrier and coupled to said movable member;
a reduction geartrain supported in said carrier between said input member and said output member; and
a clutch assembly supported in said carrier, disposed in selective torque-translating relationship between said reduction geartrain and said output member, and moveable between:
an engaged configuration wherein rotational torque generated by said motor is translated across said reduction geartrain to move said movable member with respect to said first member, and
a disengaged configuration wherein rotational torque is at least partially interrupted across said reduction geartrain to allow movement of said movable member independent of rotation of said motor.

25. An actuator for use in effecting movement of a movable member with respect to a first member of a patient support apparatus, said actuator comprising:

a carrier adapted to be secured to the first member of the patient support apparatus;
an input member rotatably supported by said carrier;
an output member rotatably supported by said carrier and adapted to be coupled to the movable member of the patient support apparatus;
a reduction geartrain supported by said carrier between said input member and said output member; and
a clutch assembly supported by said carrier, disposed in selective torque-translating relationship between said reduction geartrain and said output member, and moveable between:
- an engaged configuration wherein rotational torque is translated across said reduction geartrain to move the movable member with respect to the first member, and
- a disengaged configuration wherein rotational torque is at least partially interrupted across said reduction geartrain to allow movement of the movable member independent of rotation of said input member.

* * * * *